Jan. 5, 1926.  R. P. CAMPBELL  1,568,722
CLEAN AIR LEAD FOR TRACTOR FUEL SYSTEMS
Filed Feb. 16, 1925    2 Sheets-Sheet 1
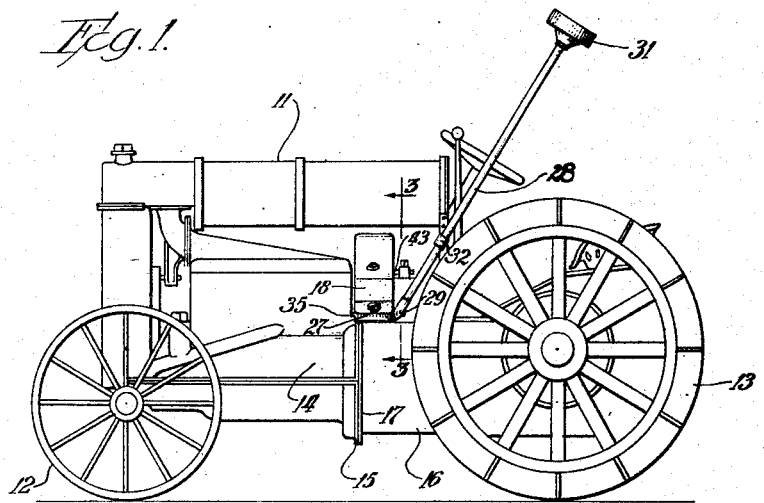
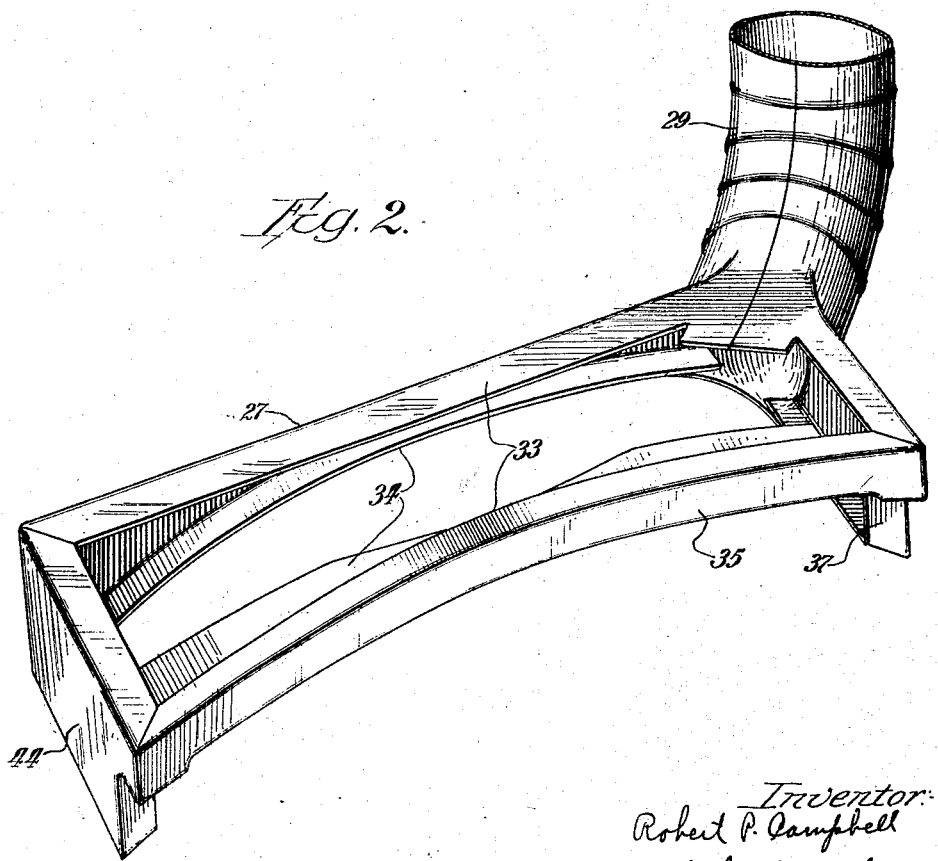
Inventor:
Robert P. Campbell
By Munday, Clarke, Carpenter
Attys.

Jan. 5, 1926.
R. P. CAMPBELL
1,568,722
CLEAN AIR LEAD FOR TRACTOR FUEL SYSTEMS
Filed Feb. 16, 1925   2 Sheets-Sheet 2
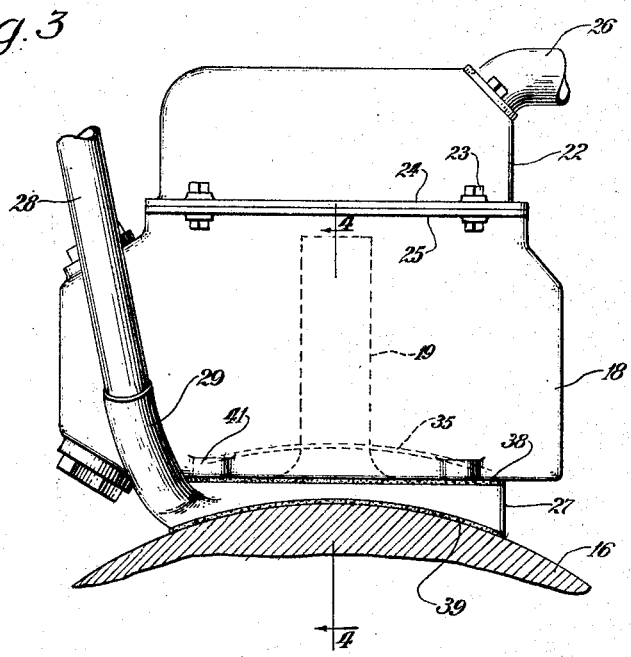
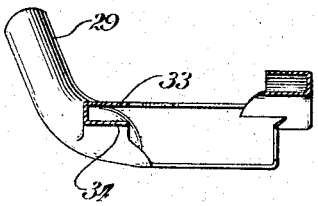
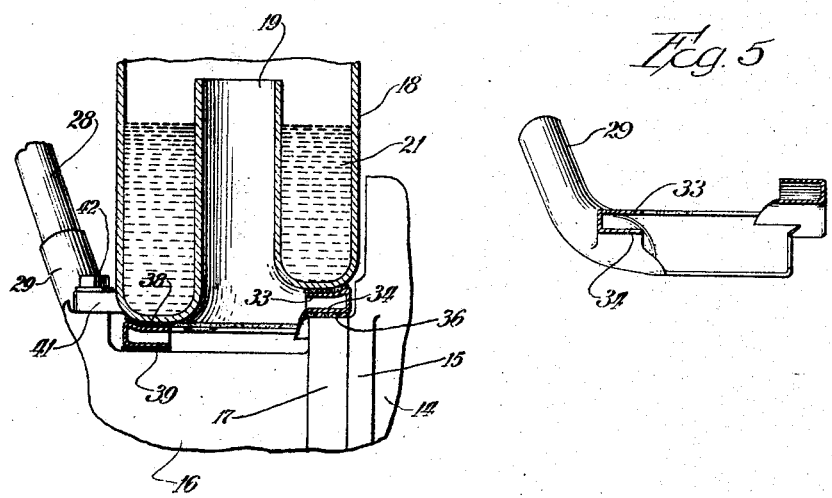
Inventor:
Robert P. Campbell
By: Munday, Clarke & Carpenter
Attys Patented Jan. 5, 1926.

UNITED STATES PATENT OFFICE.

ROBERT P. CAMPBELL, OF ATTICA, KANSAS.

CLEAN-AIR LEAD FOR TRACTOR FUEL SYSTEMS.

Application filed February 16, 1925. Serial No. 9,699.

*To all whom it may concern:*

Be it known that I, ROBERT P. CAMPBELL, a citizen of the United States, residing in Attica, in the county of Harper and State of Kansas, have invented a new and useful Improvement in Clean-Air Lead for Tractor Fuel Systems, of which the following is a specification.

My invention relates to air delivery means for internal combustion engines and has for its object the provision of a device which I have designated as a clean air lead, the purpose of which is to supply air to the air washer of a Fordson tractor or the like from such a distance above the ground as to insure the air being clean and free from dirt and dust raised by the tractor.

When used in farm work, such as plowing in dry ground, a tractor often stirs up a thick cloud of dust, which fills the immediate zone of operations and renders the air very impure and dirt-laden at the intake of the air washer, which normally is underneath the bowl, just to the rear of the engine. Obviously, when the air is taken in from this area, it will carry impurities into the washer in such large quantities that the operation will be interfered with and frequent cleaning out will be necessary.

My invention contemplates sealing the air intake from the atmosphere in the dust zone and supplying pure air from a height above said zone, and the device provided for this purpose is so constructed as to be capable of quick and easy installation, with but slight movement of the air washer, which may be restored to its original position after the device is installed and will serve, by its own form, to hold said device in place and seal the air intake from the surrounding atmosphere without the use of any screws, bolts, or other fastening devices.

Another feature of the invention is that the device may be manufactured at low cost, since it may be made from sheet metal and in a single part, except for the air supply pipe, or duct, which is preferably separate and adapted to be removed for transportation and convenience in handling.

Numerous other objects and advantages of the invention will be apparent as it is better understood from the following description, which, taken in connection with the accompanying drawings, discloses a preferred embodiment thereof.

Referring to the drawings,

Figure 1 is a side elevation of a tractor equipped with the device of my invention;

Fig. 2 is a perspective view of the device without the pipe extension;

Fig. 3 is an enlarged sectional and elevational view, taken substantially on the section line 3—3 in Fig. 1;

Fig. 4 is a sectional view, taken substantially on the line 4—4 in Fig. 3; and

Fig. 5 is a cross sectional view of the part shown in Fig. 2.

Upon said drawings, illustrating the best manner in which I have thus far contemplated employing the principles of my invention, the reference character 11 generally indicates a tractor, the particular type contemplated being the Fordson, though it will be understood that, from the broader aspects of the invention, it is not limited to use with any particular make of tractor. The frame of the tractor is supported upon front steering wheels 12 and rear traction wheels 13 and includes an engine frame part 14, which is flanged at its rear end, as indicated at 15, and a transmission frame part 16, which has a front flange 17 matching with the flange 15 and suitably secured thereto.

The air washer comprises primarily a bowl 18, having a central air passage 19 leading upwardly from the bottom thereof, means (not shown) being provided for directing the air ascending through said passage through the liquid contents of said bowl, indicated at 21, the bowl being provided with a cover 22 secured thereto by means of bolts 23 extending through matching flanges 24 and 25, the air after being cleaned in said washer being directed through a tube 26 to the fuel system of the tractor. As above stated, the air in the vicinity of the air inlet passage 19 is likely to be heavily laden with dust and dirt and I, therefore, provide means for sealing said air inlet from the surrounding atmosphere and supplying air thereto from a sufficient height above the tractor to insure its being clean and pure, regardless of the condition of the ground upon which the tractor is working. Said device comprises primarily a sealing part 27, shown clearly in Fig. 2, and an air supply pipe, or duct, 28 adapted to be inserted in an elbow 29, extending upwardly from one corner of the sealing part, said pipe carrying at its upper end an air receiving member 31 and being secured to the frame by means of a strap or band 32. The sealing part 27 is preferably formed from a single piece of resilient material, such as pressed steel, and has inwardly extending flanges 33 and 34 at the top and bottom, said flanges being folded in from the sides and ends of the body and providing continuous sealing surfaces at the top and bottom, formed in accordance with the contour of the bottom of the air washer and the tractor frame parts therebeneath. This member is offset at the front, as indicated at 35, and adapted to overlie the flange 17 at 36, vertical wall portions 37 being provided beneath and inwardly from said offset 35 and adapted to contact with the rear side of said flange 17, and the offset 35, as well as the bottom flange 34 at the opposite side and the ends being curved to conform to the cylindrical shape of said frame parts 14 and 16. Felt gaskets 38 and 39 are provided at the top and bottom, respectively, of said sealing part and extend continuously around the flanges 33 and 34 and the vertical wall part 37, said gaskets being forced into tight sealing engagement with the frame parts 14 and 16 and with the bottom of the air washer bowl 18, the latter preferably exerting sufficient pressure upon the upper flanges 33 to cause them to yield, as shown in Fig. 4, said flanges being resilient, as heretofore stated, and an unusually tight seal being thus provided. The device is held from relative movement both by compression of the air washer and by the abutments of the frame parts 14 and 16 to which the device conforms, as previously explained.

For the purpose of positioning the device, the air washer may be raised slightly by removal merely of three bolts, two of which extend through lugs 41 upon the rear of the bowl 18 and into the frame part 16, these bolts being indicated by the reference character 42 and the third bolt being indicated at 43 in Fig. 1. This operation is rendered necessary by reason of the height of the end walls 44 of the device, but the washer may then be restored to its original position and clamped in place by the same bolts originally used. It will be seen that no bolts, or other fastening devices are required for attaching my device, inasmuch as it is securely clamped between the air washer and frame parts so that the washer itself, after positioning the device as just described, holds it in proper position and under the tension desired to provide an effective seal.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. A device for supplying clean air to the air washer of a tractor comprising a sealing part arrangeable between and conforming to the shape of the bottom of the air washer and the tractor frame parts therebeneath and adapted to seal the air inlet in the bottom of said washer from the surrounding atmosphere, and an air supply pipe leading upwardly from said sealing part and adapted to supply air to said inlet from a height above the dust zone about the tractor.

2. A device for supplying clean air to the air washer of a tractor comprising a sealing part arrangeable between and conforming to the shape of the bottom of the air washer and the tractor frame parts therebeneath and adapted to seal the air inlet in the bottom of said washer from the surrounding atmosphere, a gasket disposed upon the contacting surfaces of said sealing part, and an air supply pipe leading upwardly from said sealing part and adapted to supply air to said inlet from a height above the dust zone about the tractor.

3. A device for supplying clean air to the air washer of a tractor comprising a part providing vertical walls between the air washer and frame parts of the tractor therebeneath and inwardly extending flanges adapted to be compressed between said washer and frame parts thereby sealing the air inlet in the bottom of said washer from the surrounding atmosphere, and an air supply pipe leading upwardly from said sealing part and adapted to supply air to said inlet from a height above the dust zone about the tractor.

4. A device for supplying clean air to the air washer of a tractor comprising a part providing vertical walls between the air washer and frame parts of the tractor therebeneath and inwardly extending yieldable flanges adapted to be compressed between said washer and frame parts thereby sealing the air inlet in the bottom of said washer from the surrounding atmosphere, and an air supply pipe leading upwardly from said sealing part and adapted to supply air to said inlet from a height above the dust zone about the tractor.

5. A device for supplying clean air to the air washer of a tractor comprising a part providing vertical walls between the air washer and frame parts of the tractor therebeneath and inwardly extending flanges adapted to be compressed between said washer and frame parts thereby sealing the air inlet in the bottom of said washer from the surrounding atmosphere, a gasket lining for said flanges, and an air supply pipe leading upwardly from said sealing part and adapted to supply air to said inlet from a height above the dust zone about the tractor.

6. A device for supplying clean air to the air washer of a tractor comprising a one-part sealing member adapted to be clamped by the air washer between the same and frame parts of the tractor therebeneath and to exclude the surrounding atmosphere from the air inlet in the bottom of said air washer, and means for supplying air through said sealing member to said inlet from a height above the dust zone about the tractor.

7. A device for supplying clean air to the air washer of a tractor comprising a one-part sealing member arrangeable between the air washer and frame parts of the tractor therebeneath and adapted to exclude the surrounding atmosphere from the air inlet in the bottom of said air washer, and means for supplying air to said inlet from a height above the dust zone about the tractor, said sealing member comprising vertical walls and inwardly extending yieldable flanges.

8. A device for supplying clean air to the air washer of a tractor comprising a one-part sealing member arrangeable between the air washer and frame parts of the tractor therebeneath and adapted to exclude the surrounding atmosphere from the air inlet in the bottom of said air washer, and means for supplying air to said inlet from a height above the dust zone about the tractor, said sealing member comprising vertical walls and inwardly extending yieldable flanges and being formed of pressed steel.

9. A device for supplying clean air to the air washer of a tractor comprising a one-part sealing member arrangeable between the air washer and frame parts of the tractor therebeneath and adapted to exclude the surrounding atmosphere from the air inlet in the bottom of said air washer, and an air pipe leading upwardly from one corner of said sealing member and adapted to convey air to said air inlet from a height above the dust zone about the tractor.

ROBT. P. CAMPBELL.